United States Patent [19]

Mannisto-Iches

[11] Patent Number: 4,784,426
[45] Date of Patent: Nov. 15, 1988

[54] INFANT PROTECTOR SHADE FOR AUTOMOBILE USE

[76] Inventor: Brenda A. Mannisto-Iches, 14177 Paddock St., Sylmar, Calif. 91342

[21] Appl. No.: 156,703

[22] Filed: Feb. 8, 1988

[51] Int. Cl.⁴ .............................................. B60J 3/00
[52] U.S. Cl. ..................................... 296/97.7; 135/88; 160/370.2; 297/184; 296/97 C
[58] Field of Search ................. 135/88, 90; 160/370.2, 160/368.1, 354; 296/97 C, 97 D, 97 R; 297/184

[56] References Cited

U.S. PATENT DOCUMENTS

| | | | |
|---|---|---|---|
| 1,217,474 | 2/1917 | MacGowen | 297/184 X |
| 3,339,566 | 11/1965 | Bowden | 135/88 |
| 4,118,066 | 10/1978 | Ricke | 297/184 |
| 4,583,779 | 4/1986 | Myers | 297/184 |
| 4,736,980 | 4/1988 | Eubanks | 296/97 D |

Primary Examiner—Johnny D. Cherry
Assistant Examiner—Gary C. Hoge
Attorney, Agent, or Firm—Monty Koslover Assoc.

[57] ABSTRACT

A shade for protecting an infant from incident sunlight while transporting the infant in an automobile. The shade is made of an opaque, light weight, washable material, to which are attached two drawstrings. The drawstrings hold the shade in position by means of attached suction cups to the front or back automobile window, and tying to the front seat headrest.

2 Claims, 1 Drawing Sheet

INFANT PROTECTOR SHADE FOR AUTOMOBILE USE

BACKGROUND OF THE INVENTION

Parents of infants have often experienced situations where a sun shade of some sort is needed for the infant's comfort. For automobile travel with an infant, the presently available automobile infant chairs do not, as a rule have provision for sun shading. Where such a shade may be included, the shade is short in length and width, and useful for shading children that can sit up. An infant of a few months lies down, and available shades are not useful.

A much used approach to shading the infant in an automobile, is simply to fasten a sunshade to the side window on its upper side, thereby blocking the sunlight from falling on the infant. However, this has the disadvantage of also blocking some of the driver's side vision. If used in the front seat, it can block all of the driver's side vision, creating a most undesirable result. Thus, there exists a need for a simple shade device that anyone can place in an automobile, and that will protect the infant from direct sunlight without obstructing the driver's view and creating hazards.

SUMMARY OF THE INVENTION

The invention comprises an opaque fabric sheet, shaped wider at one end than the other, to which are fastened two no-slip drawstrings running the length of the fabric, and extending at both ends. A suction cup is attached at one end to each of the drawstrings for the purpose of fastening to a window. The other end of the drawstrings is for tying to the front seat headrest. When tied in position, the side flaps of the fabric provide full shading from the sun entering side windows. The protector shade is configured so that it may provide maximum protection for the infant from direct sunlight, without significantly blocking the driver's front or side vision.

Accordingly, it is a principal object of this invention to provide an infant protector shade for automobiles that is simple and economical, and can be installed for either front seat or back seat use.

Another object is to provide an infant protector shade that will not, when installed, significantly block the driver's front or side vision.

Further objects and advantages of the invention may become apparent from the study of the following specification, the claims and the attached drawings.

DESCRIPTION OF THE PREFERRED EMBODIMENT

Figure 1:
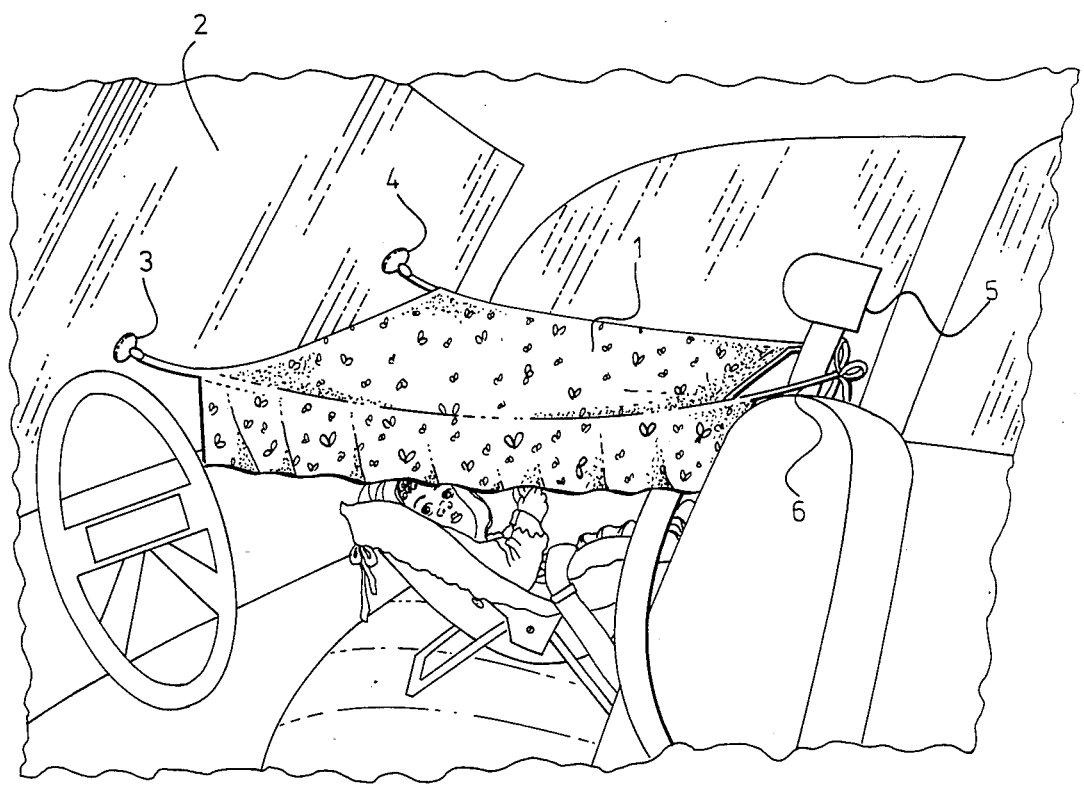
FIG. 1 is a perspective view of the present invention installed in the front seat of an automobile, and showing its relationship to the infant it is protecting from sunlight.

Referring particularly to the drawings, there is shown in FIG. 1 a preferred embodiment of the infant protector shade 1 installed in the front seat of an automobile. The protector shade 1 is attached by its drawstrings 6 to suction cups 3 and 4 and thence to the front window 2 of the automobile. The shade right end is tied to the seat headrest 5 by the ends of drawstrings 6. As depicted, the protector shade 1 does not block the driver's front or side view. The driver is able to look over the shade.

The protector shade 1 may also be used when the infant is in the back seat of the automobile. In this case, the suction cups would be attached to the rear window and the ends of the drawstrings 6 again tied to the front seat headrest 5.

Figure 2:
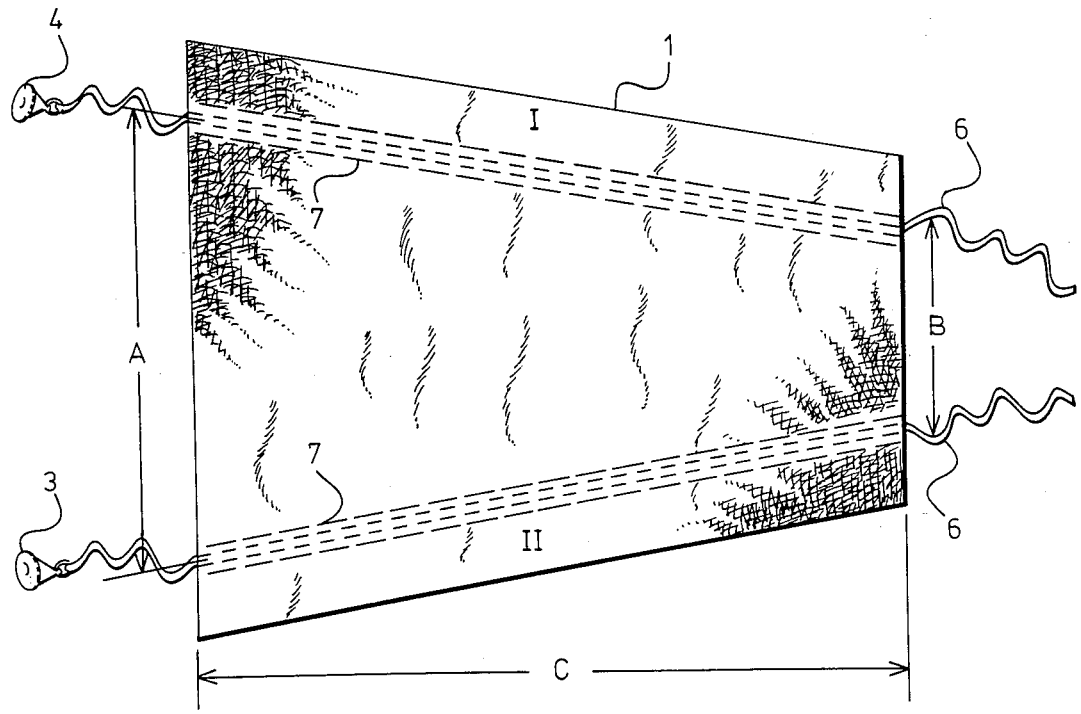
FIG. 2 is a plan view of the device laying flat so that its shape and proportions can be clearly seen.

Referring now to FIG. 2, a layout of the infant protector shade is shown. The shade 1 is a truncated triangular shaped material, wider at its front end and narrow at its back end, in a configuration to cover the infant completely. The fabric used for the shade 1 can be any washable, opaque, light weight fabric. The width 'A' between drawstrings 6 at the front (left end) of the shade 1 is approximately 21 in., providing for adequate overhead coverage of the infant without unduly blocking the driver's vision. The width 'B' between drawstrings 6 at the back (right end) of the shade 1 is approximately 7 in. This width between drawstrings 6 fits most automobile seat headrests. The side flaps, marked I and II, are each approximately 6 in. wide, providing the infant with full shading from the sun entering the side windows when the flaps are hanging down. The dimension 'C' of the shade 1 is approximately 28 to 32 in., ensuring that the infant is fully covered.

Two drawstrings 6 are each inserted in a channel 7 sewn in the fabric of the shade 1, and the ends left out for tying to either the suction cups 3 and 4 or to the automobile headrest 5. The drawstrings 6 are each preferably made of grosgrain ribbon, which is a ribbon having heavy, crosswise cords. This ribbon material is selected due to its minimal stretching and slipping properties, which are desirable properties ensuring that the shade fabric will not slide and slip along the drawstrings, and the shade 1 will stay in its position as originally placed in the automobile. The length of the drawstrings 6 is approximately 65 in., allowing for adjustment of the shade to all types of vehicles.

The suction cups 3 and 4 are standard available suction cups preferably having a hook so that the drawstrings 6 may be easily tied to them. For laundering the shade, the suction cups would be detached.

As described in the foregoing paragraphs, the infant protector shade is simple in construction, easy to use and economical. It can also be conveniently laundered when necessary, so as to keep it suitable for use with an infant. From the above description, it is apparent that the preferred embodiment achieves the objects of the present invention. Alternative embodiments and modifications will be apparent from the above description to those skilled in the art. These embodiments and modifications are considered to be equivalent and within the spirit and scope of the present invention.

Having described the invention, what is claimed is:

1. A device assembly comprising: a shade made of washable, light weight fabric material cut in a truncated triangular shaped configuration and having approximate dimensions of 33 in. on the front end and 19 in. on its back end, and approximately 28 to 32 in. in length; two identical drawstrings for the purpose of supporting said shade between an automobile front or back window and a seat headrest, said drawstrings being inserted in channels sewn in said shade along its longer dimension, said drawstrings being fabricated of grosgrain ribbon and not permitting said shade to unintentionally slide or slip along said drawstrings; two identical suction cups made of a rubber or plastic material and having hooks for the purpose of tying said drawstrings to them and for fastening the device to an automobile window; said shade when assembled with said drawstrings inserted in its channels and said suction cups attached, being configured for installation in an automobile so as to protect an infant from incident direct sunlight while avoiding obstruction of the driver's front and side vision.

2. The device assembly of claim 1 wherein:
two side flaps are formed in said shade by the insertion of said drawstrings, said flaps providing the infant with protection from incident sunlight entering the automobile side windows.

* * * * *